United States Patent [19]

Mori

[11] 4,284,279
[45] Aug. 18, 1981

[54] PHONOGRAPH RECORD PLAYER
[75] Inventor: Yoshihisa Mori, Tokyo, Japan
[73] Assignee: Sony Corporation, Tokyo, Japan
[21] Appl. No.: 121,508
[22] Filed: Feb. 14, 1980
[30] Foreign Application Priority Data Feb. 21, 1979 [JP]  Japan .............................. 54/20186[U]

[51] Int. Cl.³ ......................... G11B 3/02; G11B 25/04
[52] U.S. Cl. ....................................... 369/63; 46/259; 369/177
[58] Field of Search ............... 274/1 R, 1 A, 9 R, 9 C; 46/259

[56] References Cited

U.S. PATENT DOCUMENTS

| | | | |
|---|---|---|---|
| 1,341,102 | 5/1920 | Belknap | 274/1 A |
| 2,236,431 | 3/1941 | Hollingsworth et al. | 274/1 A |
| 2,690,626 | 10/1954 | Gay et al. | 46/259 |
| 2,978,836 | 4/1961 | Kato | 274/1 A |
| 3,086,319 | 4/1963 | Frisbie et al. | 46/259 |
| 3,362,716 | 1/1968 | Dunn | 274/23 R |
| 4,166,624 | 9/1979 | Mori et al. | 274/1 A |

Primary Examiner—John W. Shepperd
Attorney, Agent, or Firm—Lewis H. Eslinger; Alvin Sinderbrand

[57] ABSTRACT

A record player for use with a stationary conventional record disc having a spiral sound groove with signals recorded therein includes a freely movable body which is placed on the record disc, a drive assembly for causing the movable body to effect random movements over the record disc, a pick-up or cartridge pivotally mounted at the underside of the movable body to pivot about a pivot axis for engaging the sound groove and reproducing the signals recorded therein while tracking the spiral sound groove as the movable body travels on the record disc, and a guide assembly for controlling the travel of the movable body relative to the record disc in response to pivotal movement of the pick-up. The guide assembly includes a guide wheel disposed in advance of the pivot axis so that the guide wheel provides a radial inward force to compensate for centrifugal forces acting on the movable body in moving in a generally circular path defined by turns of the spiral sound groove.

8 Claims, 5 Drawing Figures

PHONOGRAPH RECORD PLAYER

BACKGROUND OF THE INVENTION

1. Field of the Invention

This invention relates to phonograph record players, and more particularly to a toy record players having a movable body for following the spiral track on a stationary record disc.

2. Description of the Prior Art

Various toys are known having therein a miniature phonograph device. Such toys include talking dolls or animals, talking cars and musical vehicles. The incorporation of such a phonograph device into the body of a toy makes the construction of such a toy rather complex, and moreover it is difficult to provide for sound reproduction of any substantial length or variety.

Another toy phonograph device is described in U.K. Pat. Specification No. 1,145,550, and such device comprises a pair of guide rails formed on a special phonograph record member, a vehicle body having wheels to be guided by the rails, a spiral sound groove formed between the guide rails on the record member, and a cartridge member connected to the vehicle body and operative to reproduce a sound recorded in the sound groove on the record member.

With this device, where the gauge of the guide rails is fairly large, it may still be possible to reproduce sound for a reasonably long time. However, it is required to provide the special record member, with the two projecting guide rails, for each different sound to be reproduced. It is not possible to reproduce sounds from a conventional disc record now available to consumers, because such records lack the required guide rails.

In an attempt to eliminate the foregoing disadvantage, an improved toy phonograph device has been contrived which is capable of reproducing sounds from a conventional record disc (i.e., of the type without guide rails). In such a device, as described, for example, in commonly-assigned copending Application Ser. No. 942,269, filed Sept. 14, 1978, a movably body is equipped with a propulsion mechanism and a pickup cartridge operatively arranged on the body in such a manner that, when the movable body travels along the sound groove on the record disc, a reproducing stylus of the pickup cartridge tracks the sound groove of the record disc to reproduce the signals prerecorded therein, and at the same time guides the movable body along the sound groove. In such a device, however, because the device is driven in a generally circular path around the record disc, the movable body is subjected to a centrifugal force thereby disturbing the operation of the device by causing disengagement of the stylus from the sound groove and instability in controlling the direction of travel. Such disturbances are most noticeable when the moveable body travels at a relatively high rate of speed, such as during playing of a 45 rpm record disc or when reproducing the outermost portion of a 33⅓ rmp record disc.

OBJECTS AND SUMMARY OF THE INVENTION

Accordingly, it is an object of the present invention to provide a record player which overcomes the above described defects of conventional record players.

More specifically, it is an object of the invention to provide a record player that can accurately reproduce sound signals on a conventional record disc.

Another object of the invention is to provide a record player that is both compact and simple to operate.

A further object of the invention is to provide a record player, as aforesaid, which does not require a rotating turntable.

A still further object of the invention is to provide a record player having a movable body which can be made to travel on a conventional record disc so as to cause a transducer or cartridge carried by the body to reproduce signals recorded in a spiral groove on the disc.

A yet further object of the invention is to provide a record player wherein a guide member is attached to the movable body to assure that the body travels along the sound groove on a record disc.

A further object of the invention is to provide a record player wherein the guide member assures that the movable body travels stably toward the center of a record disc.

A still further object of the invention is to provide a record player wherein the movable body can be made to stop automatically at any desired position on the record disc, such as the inner circumferential portion of the record disc.

In accordance with an aspect of this invention, a phonograph record player suitable for use with a stationary disc phonograph record having a spiral sound groove comprises a freely movable body to be placed on the record, drive means for propelling the movable body to move in a generally circular path on the record, sound pickup means associated with the movable body for reproducing the signals recorded in the sound groove, and a sound groove guide assembly connected to the movable body for guiding the movable along the sound groove. The guide assembly includes a support member pivotally mounted on the body, for example, by means of a shaft mounted on the movable body, for pivotal motion about a pivot point on the movable body, a guide member mounted on the support member to engage the sound groove in the record disc and to control the direction of travel of the movable body, and a guide wheel rotatably mounted on the support member to roll on the record disc and at least partially to support the weight of the movable body. The guide wheel is displaced from the pivot point of the support member sufficiently that, when the movable body is propelled along the sound groove of the record disc in its generally circular path, the guide wheel urges the movable body toward the center of the record disc to compensate for the centrifugal forces acting on the movable body.

The above, and other objects, advantages and features of the present invention, will be apparent in the following detailed description of a preferred embodiment, which is to be read with the accompanying drawings.

DETAILED DESCRIPTION OF A PREFERRED EMBODIMENT

Figure 1:
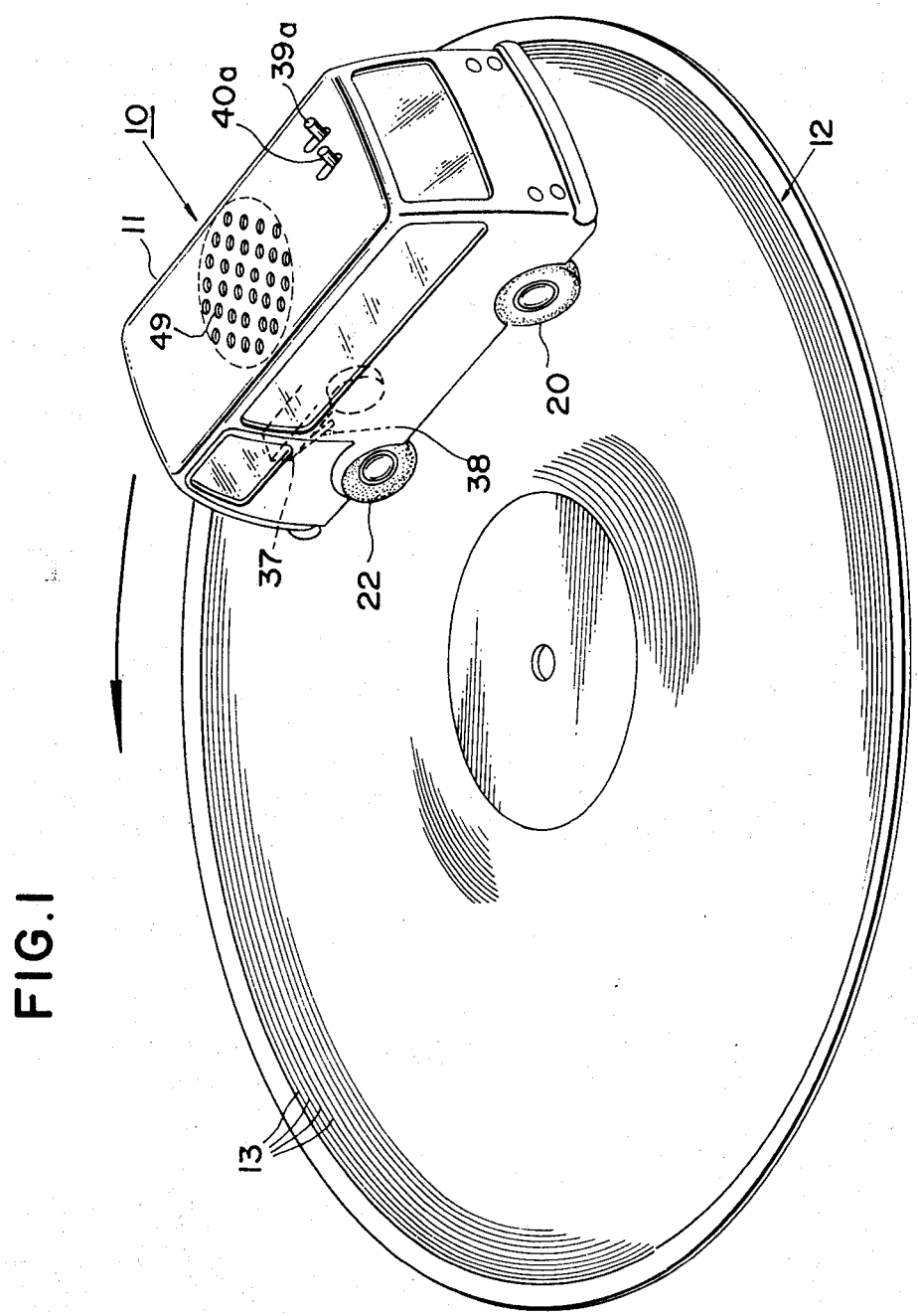
FIG. 1 is a perspective view of a record player embodying the present invention, illustrating the record player in operation.
Figure 2:
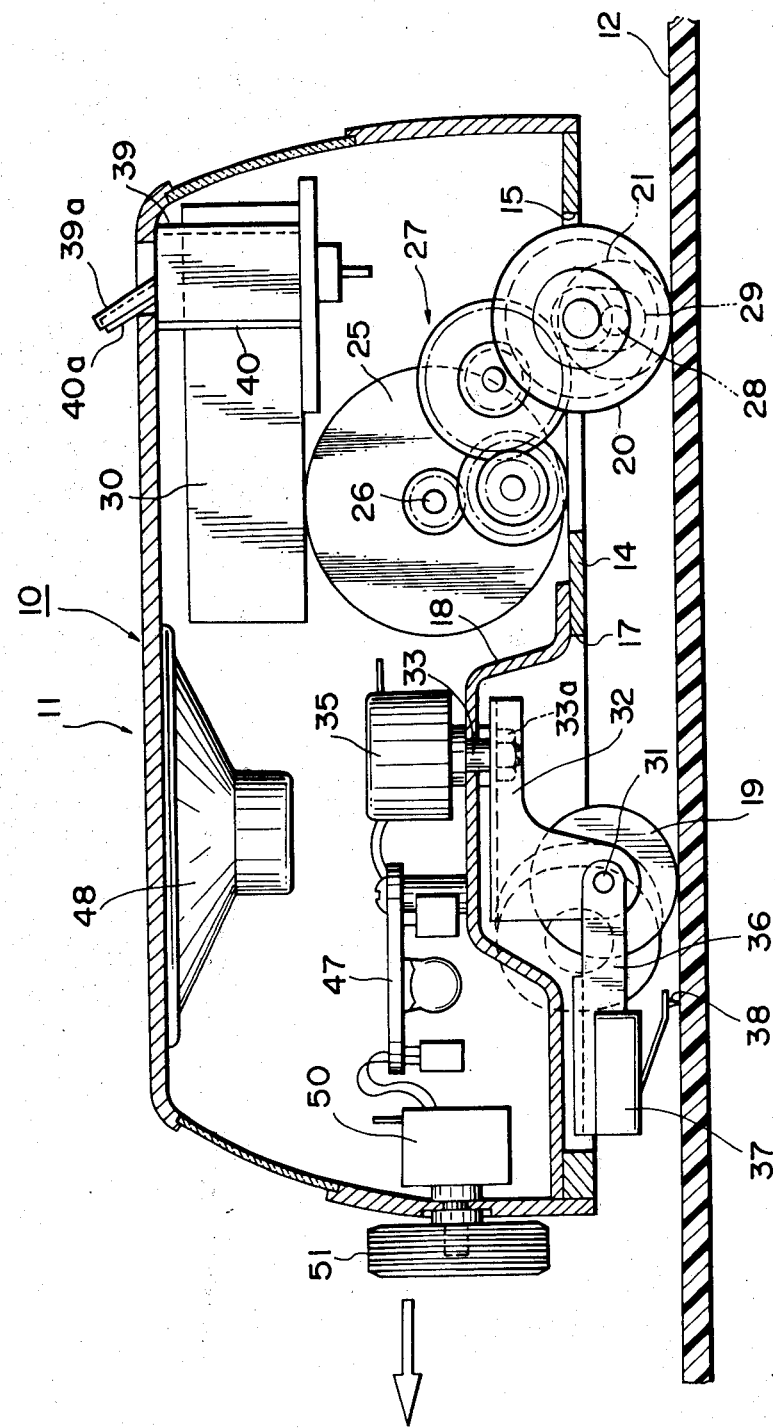
FIG. 2 is an enlarged, longitudinal sectional view of the record player.
Figure 3:
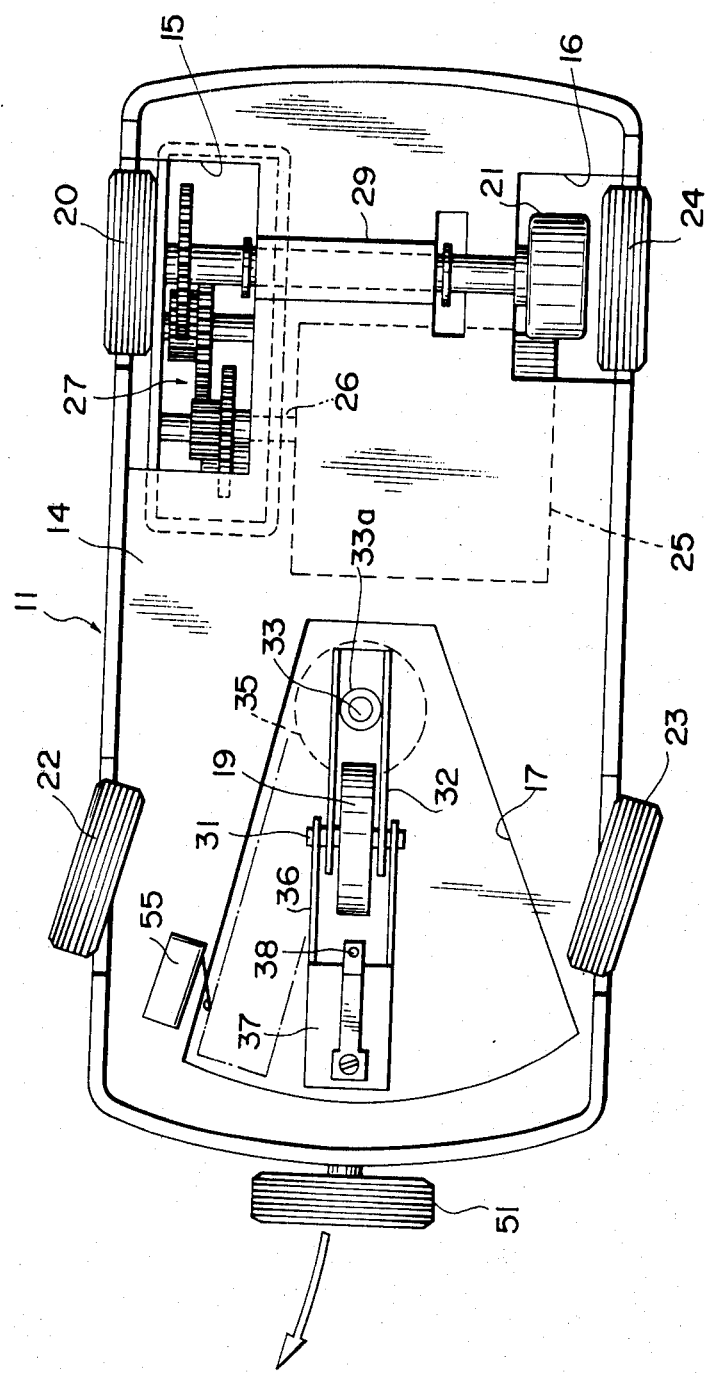
FIG. 3 is an enlarged bottom view of the record player.

Referring to the drawings in detail, and initially to FIGS. 1–3 thereof, it will be seen that a record player 10 according to this invention generally comprises a movable body 11, shown in the form of a toy bus or van, which is adapted to be placed on a conventional phonograph record disc 12 having a spiral groove 13 at least in its upper surface in which sound or audio signals are recorded. The body 11 has a base or chassis 14 (FIGS. 2 and 3) at the bottom thereof, and such chassis is formed with cutouts 15 and 16 at the opposite sides of its rear portion and a fan-shaped cutout 17 which is laterally centered in respect to the forward portion of the chassis (FIG. 3). A raised frame 18 extends over cutout 17 (FIG. 2) and is suitably secured to chassis 14.

The body 11 is supported for rolling movement over the upper surface of record disc 12 by means of a steerable guide wheel 19, a rear wheel 20 disposed at one side of body 11 and a drive wheel 21 disposed adjacent the opposite side of body 11 also at the rear portion of the latter. In addition to the foregoing operative wheels 19, 20 and 21 which are intended to make rolling contact with the upper surface of record disc 12, body 11 of record player 10 is provided with front wheel simulations 22 and 23 at opposite sides of the front portion of body 11 and a rear wheel simulation 24 disposed laterally outside of drive wheel 21 at the side of body 11 remote from rear wheel 20. The front wheel simulations 22 and 23 and the rear wheel simulation 24 are dimensioned and positioned so as to be inoperative or raised from the upper surface of record disc 12 when wheels 19, 20 and 21 are in rolling engagement therewith.

In order to drive body 11 of record player 10 along the surface of record disc 12, an electric motor 25 is suitable mounted within body 11 on chassis 14 and has its motor shaft 26 connected by way of a gear transmission 27 with one end portion of a shaft 28 which extends laterally under the rear portion of chassis 14 in a sleeve bearing 29. The drive wheel 21 is secured to the end of shaft 28 remote from the gear transmission 27. A battery or batteries 30 mounted above motor 25 in body 11 (FIG. 2) supplies the power for driving motor 25, as hereinafer described in detail. The rear wheel 20 is suitably mounted on body 11 so as to be freely rotatably by reason of its rolling contact with the record disc when body 11 is made to move by drive wheel 21.

The guide wheel 19, as a part of a guide assembly, is freely rotatable on an axle 31 which is mounted at one end portion of a yoke or mounting bracket 32. The opposite end of the mounting bracket 32 is suitably mounted under raised frame 18 for turning about a vertical axis, that is, an axis perpendicular to the surface of record disc 12. For example, in the illustrated preferred embodiment, mounting bracket 32 is secured at one end thereof, as by a set screw 33a, on a vertical shaft 33 which extends downwardly through frame 18 from a potentiometer or variable resistor 35 secured on frame 18 and having its resistance value varied in response to turning of shaft 33 with yoke or mounting bracket 32. A cartridge support arm or frame 36 extends forwardly from the other end of bracket 32 below raised frame 18, and the end of frame 36 is mounted on the ends of axle 31, on which guide wheel 19 is also mounted so that cartridge support arm or frame 36 is mechanically connected to the shaft 33 through the bracket 32 and is mounted for pivoting about a horizontal axis parallel to the surface of record disc 12. A cartridge or pickup 37 is suitably mounted in frame 36 ahead of axle 31 and has a stylus 38 depending therefrom. Naturally, the action of gravity on frame 36 and cartridge 37 therein tends to pivot frame 36 downwardly about the axis of axle 31 so that stylus 38 is urged into engagement with the upper surface of record disc 12 for tracking the spiral groove 13 and reproducing the signals recorded therein as movable body 11 is driven around the record disc. It is a significant feature of the structure of this embodiment that guide wheel 19 is positioned anterior to the shaft 33 and also that the stylus 38 serves to guide the direction of motion of the wheel 19. The significance of this feature will be further discussed below.

Figure 4:
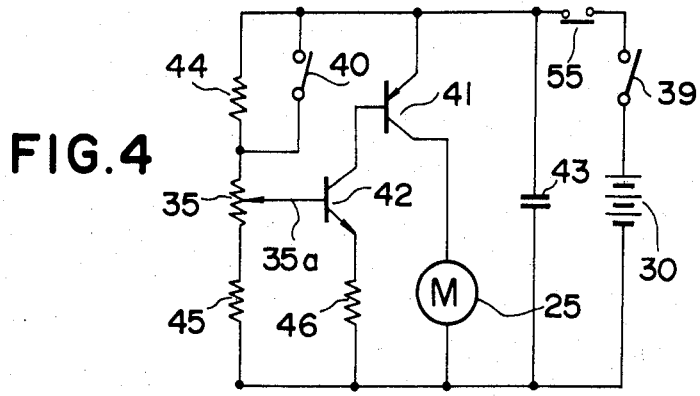
FIG. 4 is a circuit diagram of a control circuit for the record player.

Referring now to FIG. 4, it will be seen that a speed control circuit for motor 25 includes, in addition to battery 30 and variable resistor 35, an on-off switch 39, a speed-selecting switch 40, a PNP-type transistor 41, an NPN-type transistor 42, a capacitor 43 and resistors 44, 45 and 46. The transistors 41 and 42, capacitor 43 and resistors 44–46 may be provided on a printed circuit board 47 mounted within body 11 above frame 18 and having suitable electrical connections to battery 30, motor 25 and variable resistor 35, as well as switches 39 and 40 which are also mounted in body 11 and have switch actuators 39a and 40a, respectively, extending out of the body for operation by the user of record player 10. Circuit board 47 may also carry the usual amplifier circuits or the like by which signals reproduced by cartridge or pickup 37 are suitably amplified to drive a loudspeaker 48 mounted against the top of body 11 for emitting audible sounds or music through perforations 49 therein (FIG. 1). The loudness of the reproduced sounds may be conveniently controlled by a variable resistor 50 (FIG. 2) which is adjustable by manual actuation of a knob 51 simulating a spare tire or wheel at the front of body 11.

Referring again to FIG. 4, it will be seen that the emitter of transistor 41 is connected through on-off switch 39 with the positive side of battery 30, while the collector of transistor 41 is connected through motor 25 to the negative side of the battery. Capacitor 43 is connected across switch 39 and battery 30 and the base of transistor 41 is connected to the collector of transistor 42 which has its emitter connected through resistor 46 to the negative side of battery 30. The base of transistor 42 is connected to a movable tap 35a of variable resistor 35 which is connected between resistors 44 and 45 for forming a voltage divider with the latter. The speed-selecting switch 40 is shown to be connected in parallel with resistor 44 so as to shunt or by-pass the latter when switch 40 is closed. It will be appreciated that tap 35a of variable resistor 35 is moved along the resistance element of the latter in response to turning of shaft 33 with mounting bracket 32. A switch 55 is provided in the cutout 17 (FIG. 3) at a position where it can be contacted by the frame 36 when the latter swings to the position shown in ghost lines. The switch 55 is of the normally-closed type and is caused to open by contact with the frame 36 when the body 11 traces the radically inner portion of the record disc, which corresponds to the final portion of the sound groove.

Figure 5:
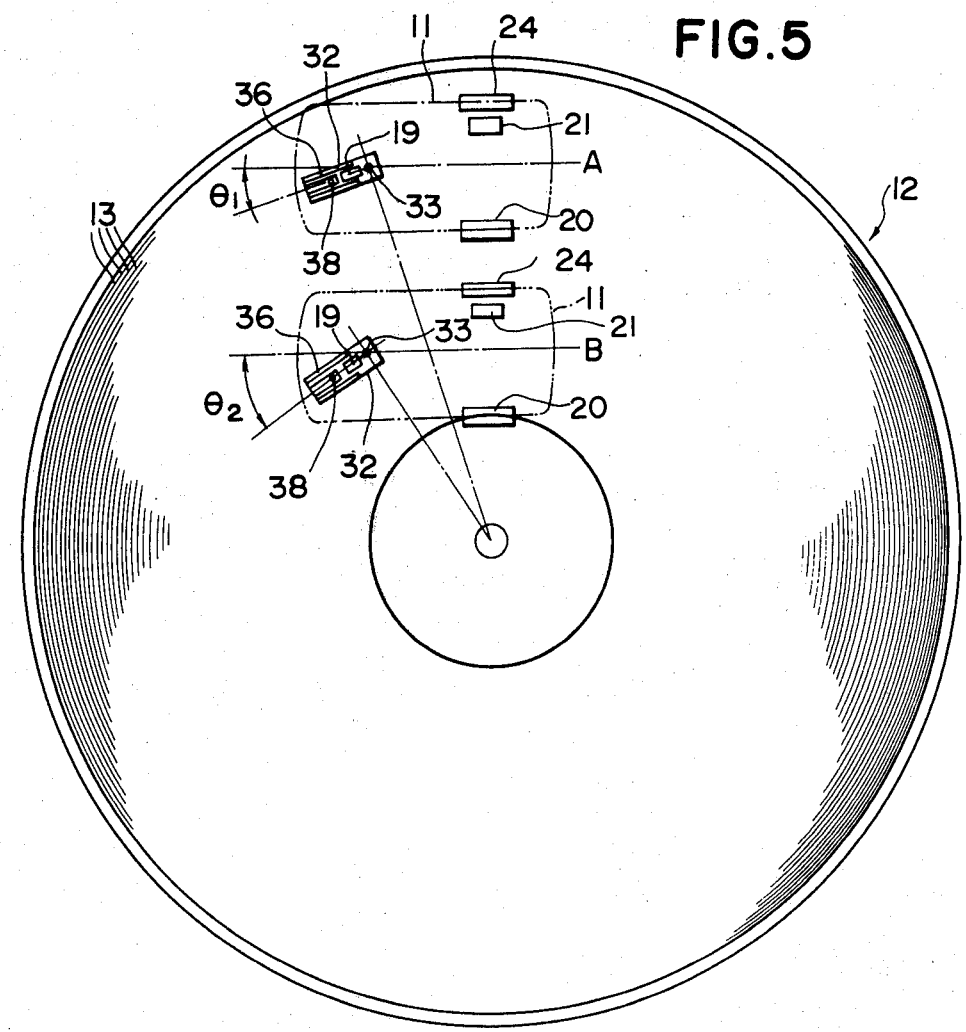
FIG. 5 is a schematic plan view of a record disc to which reference will be made in explaining the operation of the record player.

The above described record player 10 according to this invention operates as follows:

Initially, the user places movable body 11 on the stationary record disc 12 at any desired location where a playback or reproducing operation is to commence, for example, at the position A on FIG. 5 which is at a relatively large radial distance from the center of disc 12. After the stylus 38 of cartridge 37 has been engaged with spiral groove 13, and after speed-selecting switch 40 has been opened or closed so as to select the appropriate speed of movement of body 11 that is suitable for playing the record disc 12, for example, 33⅓ or 45 rpm, switch 39 is actuated so as to initiate operation of motor 25. Upon such operation of motor 25, the rotation of its shaft 26 is transmitted through gear transmission 27 to shaft 28 and thence to drive wheel 21 for driving body 11 in a counterclockwise direction around record 12, as viewed on FIG. 5. With such movement of body 11, the corresponding movement of stylus 38 along groove 13 causes reproduction by cartridge 37 of the sound or audio signals recorded in the groove, whereupon the reproduced signals are amplified and applied to loudspeaker 48 to provide audible sounds, the volume of which is controlled by adjustment of knob 51.

It will be appreciated that the engagement of stylus 38 in groove 13 also serves to steer body 11 in its movement around record disc 12. More particularly, as movable body 11 is driven around record disc 12, the guide assembly constituted by cartridge-supporting frame 36, mounting bracket 32 and guide wheel 19 is turned about the vertical axis of shaft 33 so as to maintain coincidence between a tangent to spiral groove 13 at the point of its engagement by stylus 38 with a line extending from such stylus through the axis of shaft 33. Thus, as stylus 38 engages inwardly successive turns of spiral groove 13, which turns have progressively decreasing radii of curvature, the assembly of frame 36, mounting bracket 32 and guide wheel 19 correspondingly turns progressively about the vertical axis of shaft 33, for example, from a position at an angle $\theta_1$ in respect to the longitudinal axis of body 11 when the latter is disposed at position A on FIG. 5, to a position at an angle $\theta_2$ in respect to the longitudinal axis of body 11 when the latter is disposed at position B on FIG. 5. Accordingly, as body 11 is driven around record disc 12, guide wheel 19 gradually turns about the vertical axis of shaft 33 so as to progressively decrease the radius of curvature of the path followed by movable body 11 in correspondence to the progressively decreasing radii of curvature of the successive turns of groove 13.

Since phonograph record disc 12 is of conventional manufacture, it will be appreciated that the sound or audio signals recorded in its groove 13 are intended to be played back or reproduced during relative movement of the stylus and record disc at a constant angular or rotational speed, for example, at 33⅓ or 45 rpm. However, such constant angular or rotational speed of the stylus relative to the record disc requires that the relative linear speed be greater when the stylus engages an outer turn of the spiral groove than when the stylus engages a radially inner turn of the spiral groove. Thus, in the record player 10 according to this invention, turning of the assembly of cartridge-supporting frame 36, mounting bracket 32 and guide wheel 19 about the vertical axis of shaft 33, for example, from the position defined by the angle $\theta_1$ to the position defined by the angle $\theta_2$ on FIG. 5 in response to the movement of body 11 from the outer position A to the inner position B, causes corresponding turning of shaft 33 of variable resistor 35. Such turning of shaft 33 causes movement of the tap 35a of variable resistor 35 (downward as viewed on FIG. 4), so that the base voltage applied to transistor 42 is decreased and results in a corresponding decrease in the supply of current through transistor 41 to motor 25. By reason of the foregoing, the speed of movement of body 11 is progressively decreased as the latter moves along the inwardly successive turns of groove 13.

It will be further appreciated in respect to FIG. 4, that closing of switch 40, by bypassing or shunting resistor 44, increases the level of the potential applied to the base of transistor 42, notwithstanding the variation of such potential resulting from movement of tap 35a, whereby motor 25 is driven at relatively high speeds, for example, at speeds suitable for obtaining movement of body 11 around record disc 12 at 45 rpm. On the other hand, when switch 40 is opened so as to place resistor 44 in the current path with variable resistor 35 and resistor 45, the varying potentials applied to the base of transistor 42 are correspondingly lowered with the result that motor 25 is rotated at speeds suitable for causing body 11 to move around record disc 12 at 33⅓ rpm.

Upon arrival of the movable body 11 at the inner portion of the record disc 12, i.e., at the end or final portion of groove 13, the frame 36 is brought into contact with the switch 55 (as shown by ghost lines in FIG. 3), thereby shutting off the power supply for the motor 25 to stop the movable body 11.

In the device according to this invention, a significant improvement resides in the particular arrangement of the guide wheel 19 that permits the latter to be deflectable leftward and rightward from the position of vertical shaft 33 by virtue of the positioning of guide wheel 19 anterior to the shaft 33. In other words, the guide wheel 19 is always kept positioned ahead of the shaft 33 in the direction of travel of the movable body 11. Therefore, as the stylus 38 is gradually guided inwardly along the sound groove 13 of the record disc 12, the guide wheel 19 also changes its direction inwardly. As a result in response to a slight change of the direction of travel of movable body 11 relative to the sound groove 13 of the record disc 12, guide wheel 19 is moved correspondingly while maintaining in contact with the surface of record disc 12. Because of the position of guide wheel 19 in advance of shaft 33, the contact of the surface of record disc 12 with guide wheel 19 imparts a force to the latter having components in the tangential direction (i.e., parallel to the direction of travel of movable body 11) and in the radial direction toward the center of record disc 12. The component in the radial direction provides an inside force to compensate for the centrifugal force acting on the movable body 11 as it proceeds in its circular path about the record disc 12. This inside force increases with increases in rotational speed of the movable body 11 relative to the record disc. Accordingly, the centrifugal force acting on the movable body 11 during the high-speed circular travel thereof on the record disc 12 is substantially cancelled out by the inside force to prevent disengagement of the stylus 25 from the sound groove 13 and also to assure that the movable body 11 travels in a stable manner.

Although the foregoing embodiment employs the stylus 38 as a part of the guide assembly, it is to be understood that instead of the stylus 38 a brush or the like could be used as a guide member.

Although an illustrative embodiment of the invention and modifications thereof have been specifically described herein, it is to be understood that the invention is not limited to that precise embodiment or the specifically mentioned modifications, and that a person skilled in the art may effect various changes and other modifications therein without departing from the scope or spirit of the invention as defined in the appended claims.

What is claimed is:

1. A record player for use on a stationary phonograph record disc having a surface on which signals are recorded in a spiral sound groove comprising:
a freely movable body adapted to be steerably supported on said surface of the record disc for random movement in respect to the latter;
drive means operatively associated with said randomly movable body for propelling the same relative to said surface of the record disc;
sound pickup means associated with said freely movable body for reproducing the signals recorded in said groove as said freely movable body is propelled; and
a guide assembly mounted on said freely movable body for guiding the same in a generally circular path along said sound groove, including:
a support member pivotally mounted on said freely movable body for pivotal motion relative to the latter about a pivot axis on said body,
a guide member mounted on said support member to engage said sound groove and to control the direction of propulsion of said freely movable body, and
a guide wheel mounted on said support member for rotation about an axis so as to roll on the record disc and at least partially to support said freely movable body thereon at the forward end portion of said body considered in respect to the direction of said propelling thereof, the improvement wherein said axis of rotation of said guide wheel is displaced from said pivot axis of the support member as to be disposed ahead of said pivot axis in respect to said direction in which the freely movable body is propelled, and said guide member is also disposed ahead of said pivot axis so that said guide wheel is made to urge the freely movable body toward the center of said record disc as said body is propelled along said groove and a reaction on said guide wheel urges said guide member toward said center to compensate for centrifugal forces tending to disengage said guide member from said groove.

2. A record player according to claim 1, wherein said guide assembly further includes a shaft mounted on said body, and said support member is coupled to said shaft so that the latter defines said pivot axis.

3. A record player for use on a stationary phonograph record disc having a surface on which signals are recorded in a spiral sound groove comprising:
a freely movable body adapted to be steerably supported on said surface of the record disc for random movement in respect to the latter;
drive means operatively associated with said randomly movable body for propelling the same relative to said surface of the record disc;
sound pickup means associated with said freely movable body for reproducing the signals recorded in said groove as said freely movable body is propelled; and
a guide assembly mounted on said freely movable body for guiding the same in a generally circular path along said sound groove, including:
a support member pivotally mounted on said freely movable body for pivotal motion relative to the latter about a pivot axis on said body,
a guide member mounted on said support member to engage said sound groove and to control the direction of propulsion of said freely movable body, and
a guide wheel mounted on said support member for rotation about an axis so as to roll on the record disc and at least partially to support said freely movable body thereon,
said axis of rotation of said guide wheel being displaced from said pivot axis of the support member so that said guide wheel urges said freely movable body toward the center of said record disc as said freely movable body is propelled along said groove, and
wherein said sound pickup means includes a transducer mounted on said support member, and said guide member includes a stylus operatively associated with said transducer and extending therefrom.

4. A record player for use on a stationary phonograph record disc having a surface on which signals are recorded in a spiral sound groove comprising:
a freely movable body adapted to be steerably supported on said surface of the record disc for random movement in respect to the latter;
drive means operatively associated with said randomly movable body for propelling the same relative to said surface of the record disc;
sound pickup means associated with said freely movable body for reproducing the signals recorded in said groove as said freely movable body is propelled; and
a guide assembly mounted on said freely movable body for guiding the same in a generally circular path along said sound groove, including:
a shaft mounted on said body,
a support member coupled to said shaft so that the latter mounts the support member on said body and defines a pivot axis about which said support member is pivotally movable in respect to said body,
a guide member mounted on said support member to engage said sound groove and to control the direction of propulsion of said freely movable body, and
a guide wheel mounted on said support member for rotation about an axis so as to roll on the record disc and at least partially to support said freely movable body thereon,
said axis of rotation of said guide wheel being displaced from said pivot axis of the support member so that said guide wheel urges said freely movable body toward the center of said record disc as said freely movable body is propelled along said groove; and
wherein said support member is fixed to said shaft, and said drive means includes speed control means coupled to said shaft to control the speed of said freely movable body on said record disc.

5. A record player according to claim 4, wherein said speed control means governs the speed of said freely movable body in accordance with the pivoting of said support member relative to said freely movable body.

6. A record player for use on a stationary phonograph record disc having a surface on which signals are recorded in a spiral sound groove comprising:
- a freely movable body adapted to be steerably supported on said surface of the record disc for random movement in respect to the latter;
- drive means operatively associated with said randomly movable body for propelling the same relative to said surface of the record disc;
- sound pickup means associated with said freely movable body for reproducing the signals recorded in said groove as said freely movable body is propelled; and
- a guide assembly mounted on said freely movable body for guiding the same in a generally circular path along said sound groove, including:
  - a shaft mounted on said body,
  - a support member coupled to said shaft so that the latter mounts the support member on said body and defines a pivot axis about which said support member is pivotally movable in respect to said body,
  - a guide member mounted on said support member to engage said sound groove and to control the direction of propulsion of said freely movable body, and
  - a guide wheel mounted on said support member for rotation about an axis so as to roll on the record disc and at least partially to support said freely movable body thereon,
  - said axis of rotation of said guide wheel being displaced from said pivot axis of the support member so that said guide wheel urges said freely movable body toward the center of said record disc as said freely movable body is propelled along said groove;

wherein said support member comprises a bracket, a frame, and an axle supporting said guide wheel, said bracket having one end connected to said shaft and another end connected to one end of said frame by means of said axle, and said frame having a free end, remote from said bracket; and wherein said sound pickup means includes a transducer mounted on said free end of said frame.

7. A record player for use on a stationary phonograph record disc having a surface on which signals are recorded in a spiral sound groove comprising:
- a freely movable body adapted to be steerably supported on said surface of the record disc for random movement in respect to the latter;
- drive means operatively associated with said randomly movable body for propelling the same relative to said surface of the record disc;
- sound pickup means associated with said freely movable body for reproducing the signals recorded in said groove as said freely movable body is propelled; and
- a guide assembly mounted on said freely movable body for guiding the same in a generally circular path along said sound groove, including:
  - a support member pivotally mounted on said freely movable body for pivotal motion relative to the latter about a pivot axis on said body,
  - a guide member mounted on said support member to engage said sound groove and to control the direction of propulsion of said freely movable body, and
  - a guide wheel mounted on said support member for rotation about an axis so as to roll on the record disc and at least partially to support said freely movable body thereon,
  - said axis of rotation of said guide wheel being displaced from said pivot axis of the support member so that said guide wheel urges said freely movable body toward the center of said record disc as said freely movable body is propelled along said groove, and wherein said spiral groove extends from beginning portion located adjacent an edge of said record disc to a final portion located relatively closer to the center of said record disc, and said drive means further comprises switching means, operatively associated with said support member, to automatically switch off power to said drive means when said record player has reached said final portion of said spiral groove.

8. A record player according to claim 7, wherein said switching means includes a normally-closed switch mounted on said freely movable body near said support element and positioned to be contacted by said support element and thereby open said switch when said record player has reached said final portion.

* * * * *